//UnitedStates Patent [19]

Cartee et al.

[11] Patent Number: 4,766,803
[45] Date of Patent: Aug. 30, 1988

[54] VARIABLE STROKE HYDRAULIC CYLINDER CONTROL LINKAGE

[75] Inventors: Gilbert A. Cartee, Holtville, Calif.; Emmett G. Webster, New Holland, Pa.

[73] Assignee: New Holland Inc., New Holland, Pa.

[21] Appl. No.: 911,036

[22] Filed: Sep. 24, 1986

[51] Int. Cl.[4] ............................................. F01B 31/14
[52] U.S. Cl. ........................................ 92/13.4; 92/13; 92/13.3; 92/13.41; 56/208
[58] Field of Search ............... 92/13, 13.3, 13.4, 13.41; 56/208

[56] References Cited

U.S. PATENT DOCUMENTS

| | | | |
|---|---|---|---|
| 2,442,306 | 5/1948 | McCormick | 92/13.41 |
| 3,077,722 | 2/1963 | Sadler et al. | 56/377 |
| 3,153,988 | 10/1964 | Warstler | 92/13.8 |
| 3,309,116 | 3/1967 | Johnson et al. | 92/13.41 |
| 3,568,423 | 3/1971 | Hale et al. | 56/377 |
| 4,343,142 | 8/1982 | Allen | 56/397 |
| 4,473,993 | 10/1984 | Jennings | 56/208 |

OTHER PUBLICATIONS

Vermeer Model R-23 Sales Brochure.
Allen Model 852 Sales Brochure.

Primary Examiner—Robert E. Garrett
Assistant Examiner—Thomas Denion
Attorney, Agent, or Firm—Larry W. Miller; Frank A. Seemar; D. F. Marquette

[57] ABSTRACT

A control linkage for varying the length of stroke of a hydraulic cylinder is disclosed wherein a slide member is telescopically received within a bracket member, one of these members being connected to the extension end of the hydraulic cylinder while the other member is connected to the base end. A limiting mechanism in the form of a series of holes in one of the members alignable with a slotted opening in the other member and a fastener positionable within one of said holes and also through the slotted opening serves to limit the amount of telescopic movement of the slide member from the bracket member. As a result, the extension of the hydraulic cylinder can be selectively varied according to the preset length of the control linkage. An alternative embodiment in which a fastener is positionable within the holes externally of the slotted opening provides a two way stroke limiter by restricting the length of the retraction stroke of the hydraulic cylinder.

2 Claims, 12 Drawing Sheets

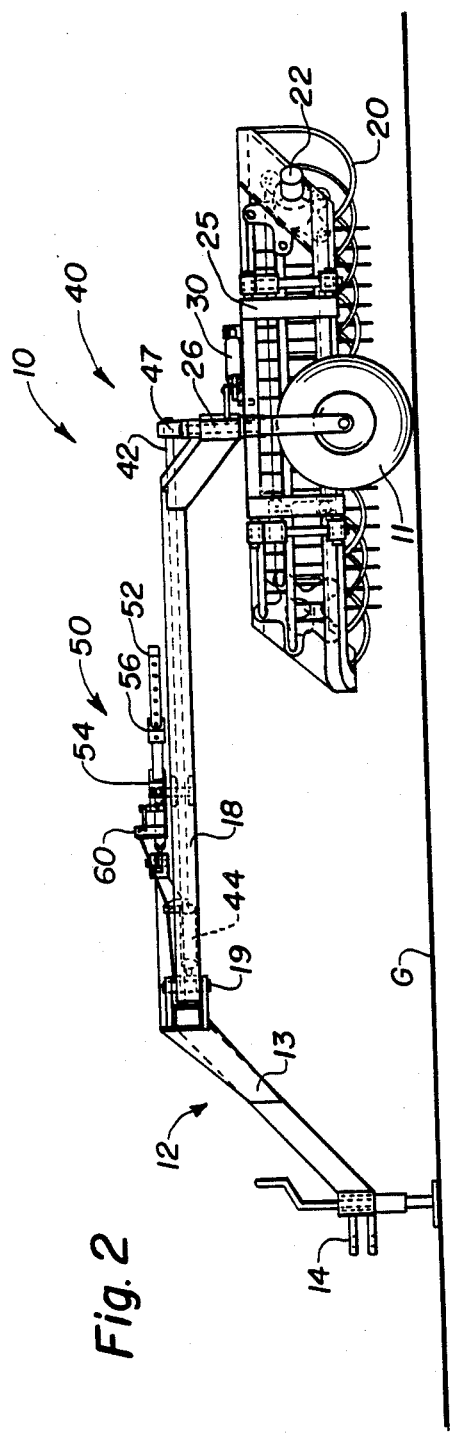
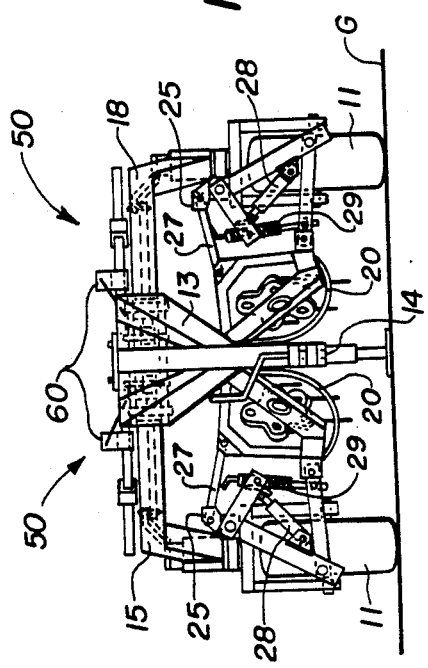
Fig. 2
Fig. 3

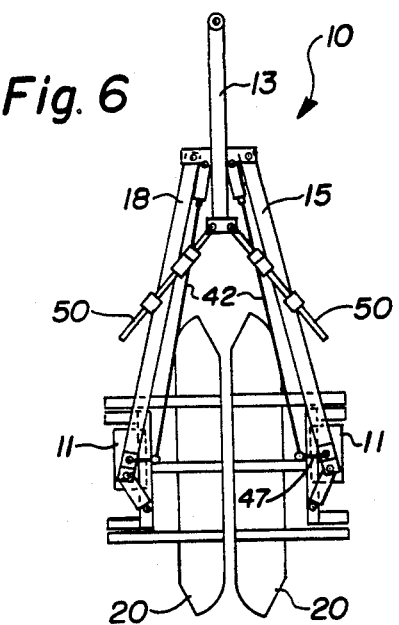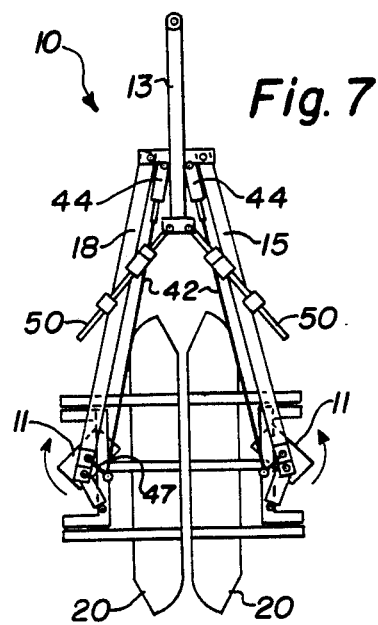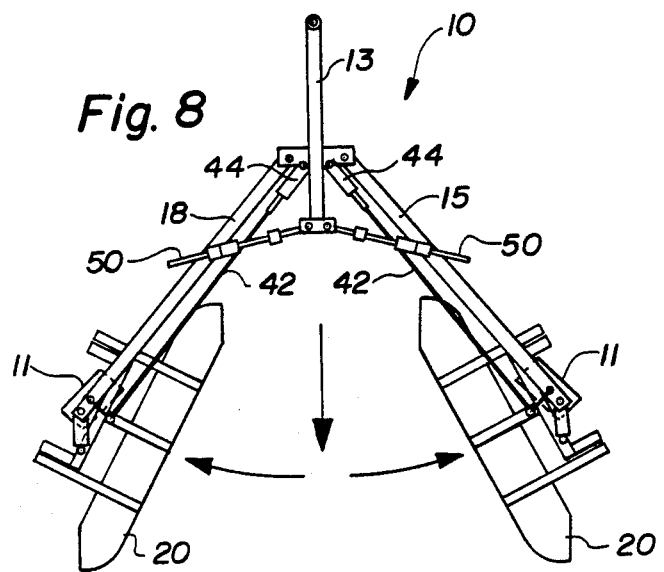

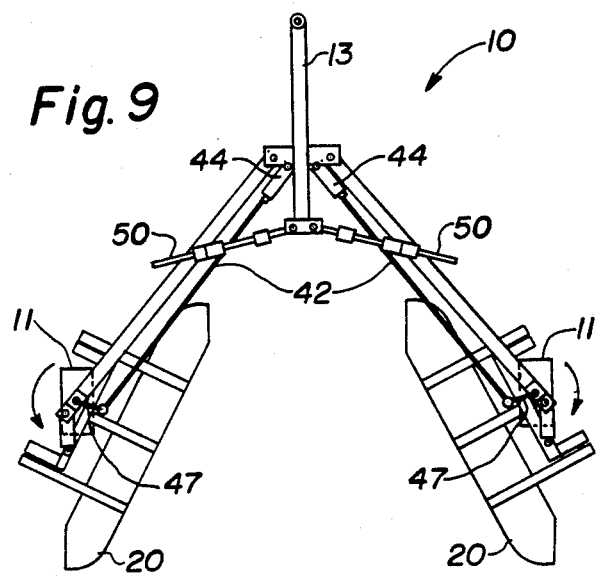
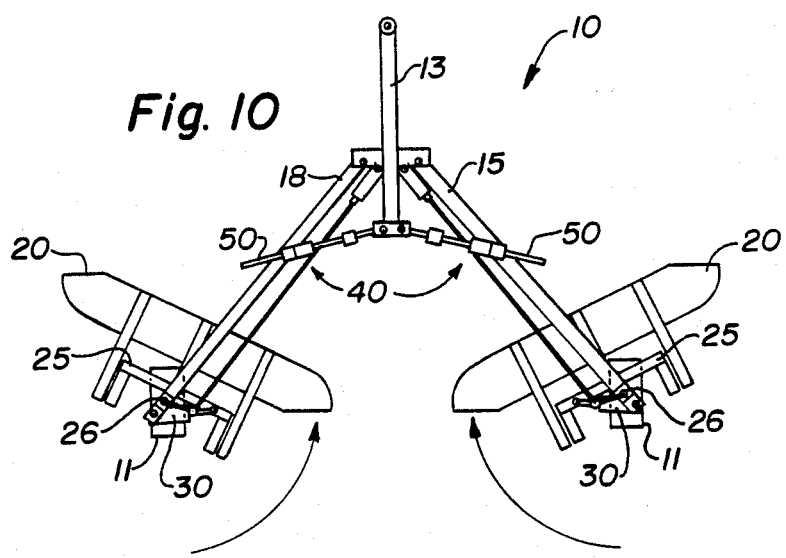

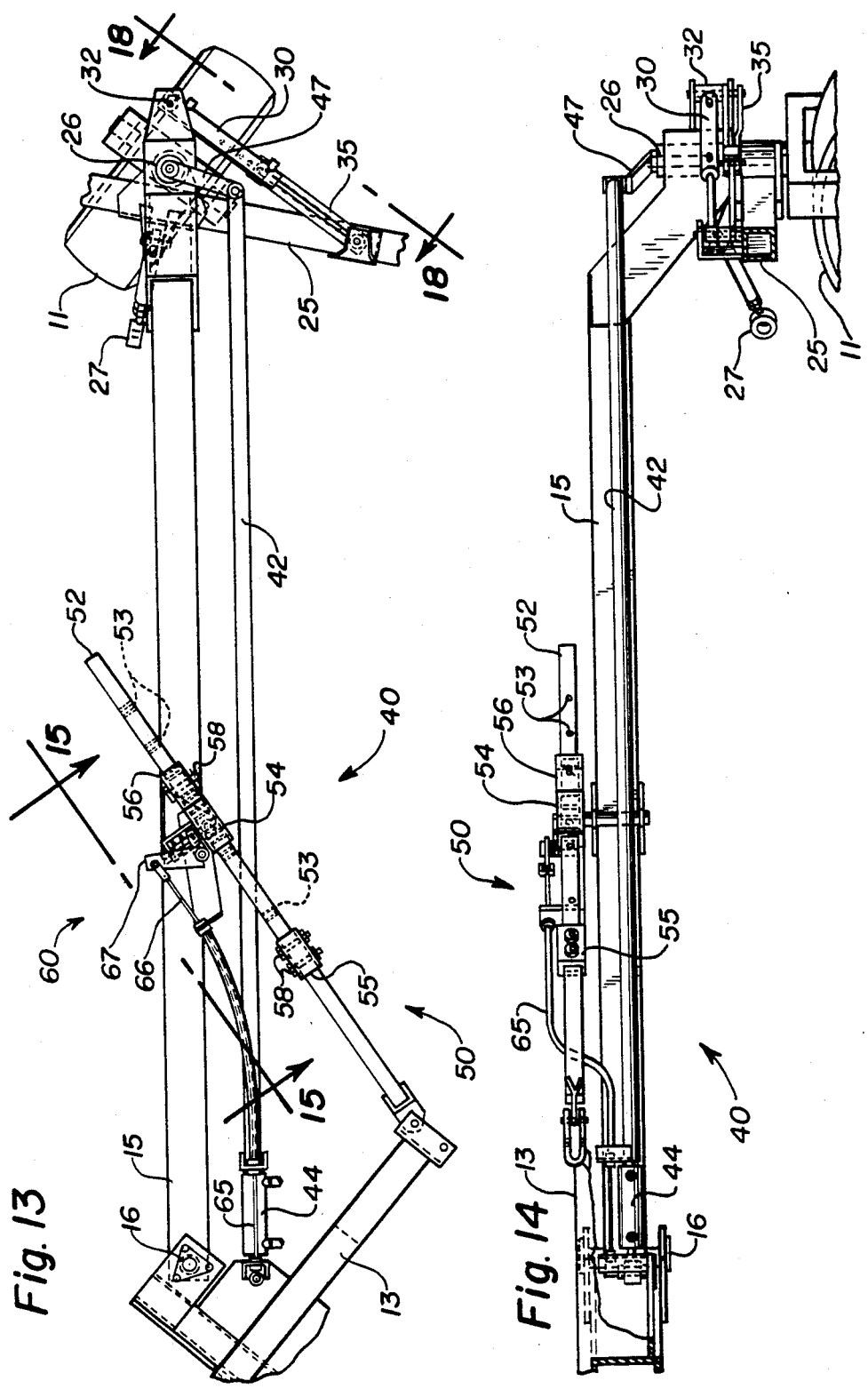

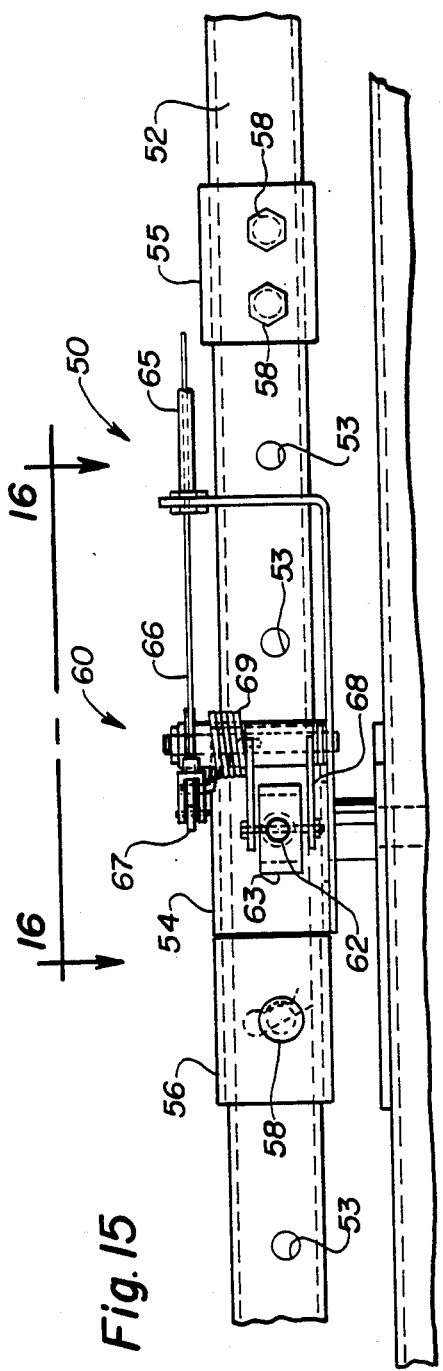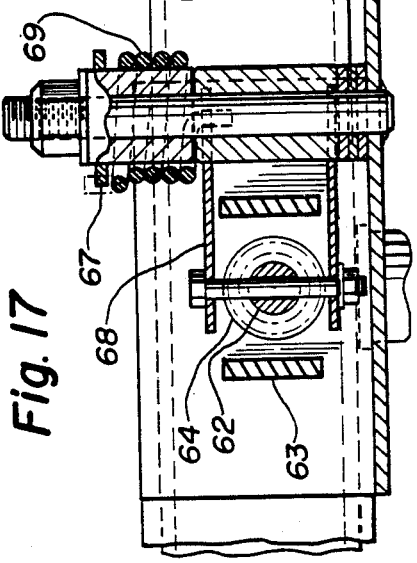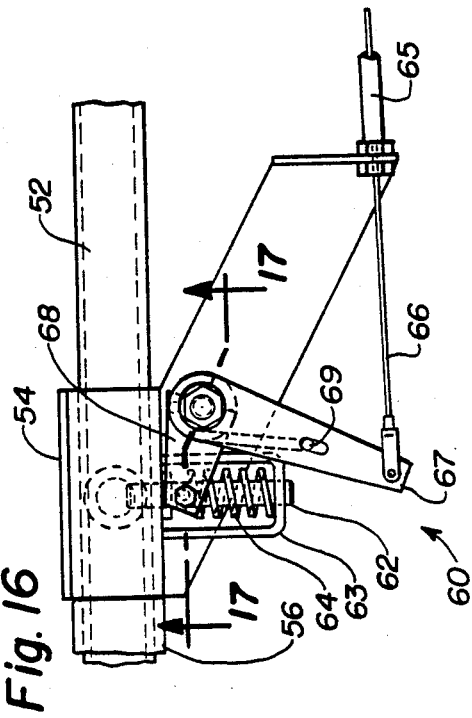

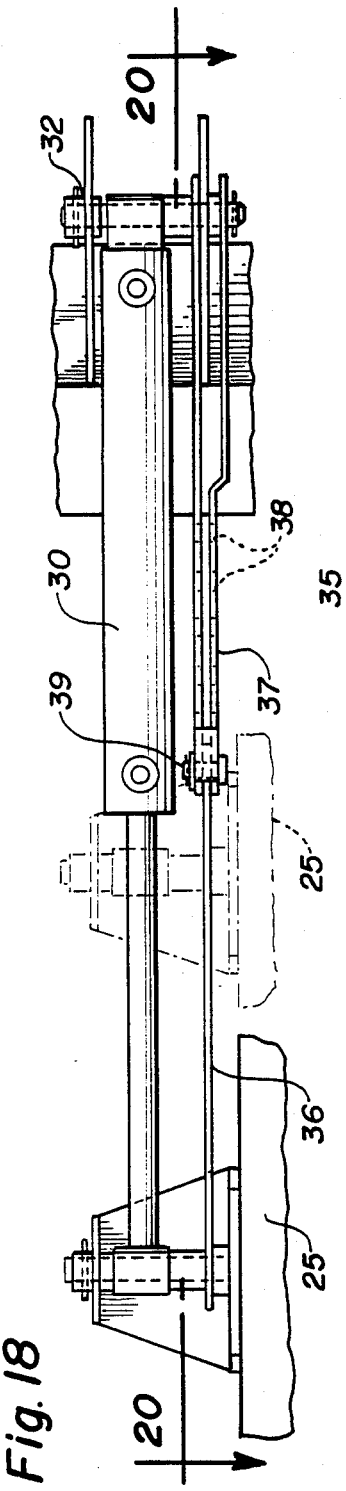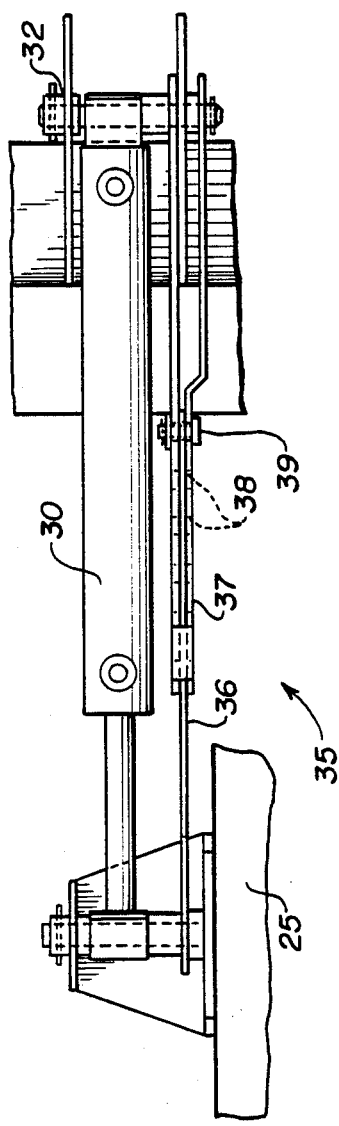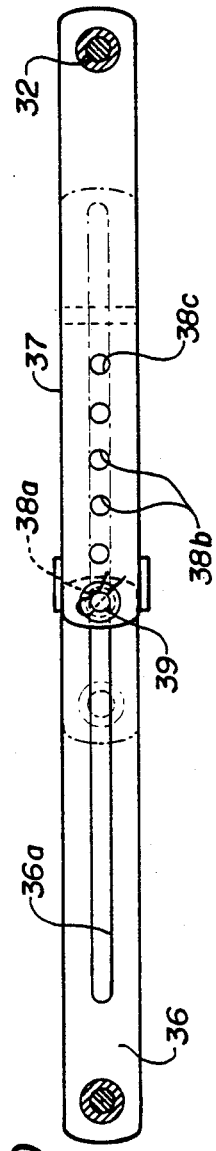
Fig. 18
Fig. 19
Fig. 20

VARIABLE STROKE HYDRAULIC CYLINDER CONTROL LINKAGE

BACKGROUND OF THE INVENTION

The present invention relates generally to hydraulic cylinder control mechanisms and, more particularly, to a control linkage for limiting the extension and retraction strokes of a hydraulic cylinder.

Hydraulic cylinders are used on equipment such as agricultural implements to selectively permit a movement of one component relative to another. On some equipment, such as a unitizing raking implement, it is desirable to move one component consistently to a preselected position; however, where the selected position can be set at a variable location between the fully retracted and the fully extended limits of the hydraulic cylinder, it is necessary to provide a stroke control limiter to restrict the movement of the hydraulic cylinder beyond a certain length of stroke.

Prior art stroke limiters generally utilize collars that mount around the rod member of the hydraulic cylinder. Such collar limiters change the length of the retraction stroke of the hydraulic cylinder by preventing the rod member from fully retracting into the hydraulic cylinder barrel. Collar limiters do not vary the extension stroke of the hydraulic cylinder from a fully retracted position. These mechanisms do not allow for a variable adjustment that is needed in certain equipment applications. Accordingly, it would be desirable to provide a stroke limiting mechanism for a hydraulic cylinder that can be selectively positionable to permit a full retraction of the rod member into the cylinder barrel, as well as limit the length of both the extension stroke and the retraction stroke of the hydraulic cylinder.

SUMMARY OF THE INVENTION

It is an object of this invention to overcome the aforementioned disadvantages of the prior art by providing a variable stroke hydraulic cylinder control linkage for use in conjunction with a hydraulic cylinder to variably limit the length of both the extension and retraction strokes of the hydraulic cylinder.

It is another object of this invention to provide a telescopicable linkage connectable to the extension end and base end of a hydraulic cylinder in which an extension limiting mechanism can be utilized to vary the stroke of the hydraulic cylinder.

It is still another object of this invention to provide a control mechanism for a hydraulic cylinder that is operable to vary the length of the extension stroke, as well as the retraction stroke, of the hydraulic cylinder.

It is an advantage of this invention that the stroke control linkage can be selectively positioned to permit a full retraction of the rod member onto the hydraulic cylinder barrel.

It is a feature of this invention that the settings for the hydraulic cylinder stroke control linkage can be changed without the need for tools.

It is another advantage of this invention that hydraulically actuated equipment can be consistently, repeatedly moved into a preselected position.

It is another feature of this invention that the stroke of a hydraulic cylinder can be mechanically limited.

It is yet another advantage of this invention that the stroke control mechanism does not interfere with a full retraction of the hydraulic cylinder.

It is a further object of this invention to provide a variable hydraulic cylinder stroke limiting mechanism which is durable in construction, inexpensive of manufacture, carefree of maintenance, facile in assemblage, and simple and effective in use.

These and other objects, features and advantages are accomplished according to the instant invention by providing a control linkage for varying the length of stroke of a hydraulic cylinder wherein a slide member is telescopically received within a bracket member, one of these members being connected to the extension end of the hydraulic cylinder while the other member is connected to the base end. A limiting mechanism in the form of a series of holes in one of the members alignable with a slotted opening in the other member and a fastener positionable within one of said holes and also through the slotted opening serves to limit the amount of telescopic movement of the slide member from the bracket member. As a result, the extension of the hydraulic cylinder can be selectively varied according to the preset length of the control linkage. An alternative embodiment in which a fastener is positionable within the holes externally of the slotted opening provides a two way stroke limiter by restricting the length of the retraction stroke of the hydraulic cylinder.

BRIEF DESCRIPTION OF THE DRAWINGS

The advantages of this invention will become apparent upon consideration of the following detailed disclosure of the invention, especially when taken in conjunction with the accompanying drawings wherein:

FIG. 2 is a left side elevational view of the unitized rake implement seen in FIG. 1;

FIG. 3 is a front elevational view of the unitized rake implement seen in FIGS. 1 and 2;

FIGS. 6 through 10 are schematic top plan views of the unitized rake implement depicting the operational sequence to convert the implement from a transport position shown in FIG. 6 to an operating position shown in FIG. 10, which corresponds to the operating position shown in FIG. 4;

FIG. 13 is an enlarged partial top plan view of the right-hand portion of the unitized rake implement shown in FIG. 4 with the side delivery rake basket and part of the supporting structure being removed for purposes of clarity, the remaining portions of the unitized rake implement being broken away;

FIG. 14 is a side elevational view of the right hand portion of the unitized rake implement seen in FIG. 13, additional portions of the draft member being further broken away for purposes of clarity;

FIG. 15 is an enlarged partial elevational view of the stabilizer bar and latching mechanism corresponding to lines 15—15 of FIG. 13;

FIG. 16 is an enlarged partial top plan view of the latching mechanism corresponding to lines 16—16 in FIG. 15;

FIG. 17 is an enlarged cross-sectional view through the latching mechanism corresponding to lines 17—17 of FIG. 16;

FIG. 18 is an enlarged elevational view of the hydraulic control cylinder operable to rotate the side delivery rake basket relative to the frame arm on which it is supported, corresponding to lines 18—18 of FIG. 13, the movement of the components interconnected by the hydraulic cylinder being shown in phantom, the variable stroke hydraulic cylinder control linkage being positioned in its maximum stroke location;

FIG. 19 is a partial elevational view of the hydraulic cylinder and control linkage shown in FIG. 18 but with the hydraulic cylinder control linkage being located in its minimum stroke position;

FIG. 20 is a cross-sectional view corresponding to lines 20—20 of FIG. 18 to show a top plan view of the variable stroke hydraulic cylinder control linkage;

DETAILED DESCRIPTION OF THE PREFERRED EMBODIMENT

Figure 1:
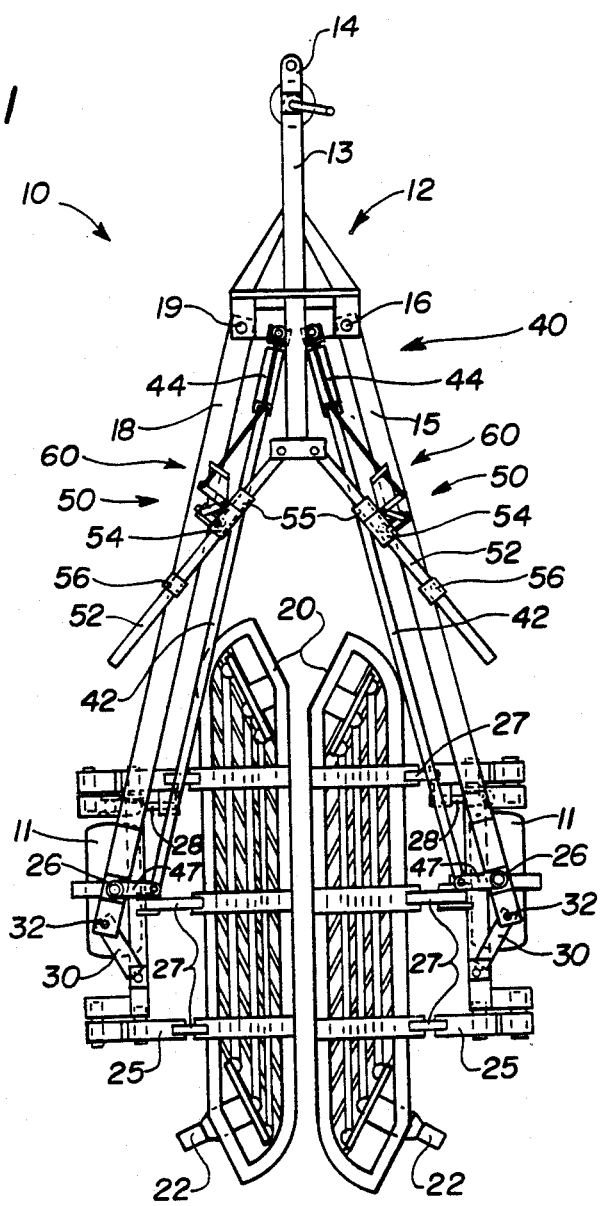
FIG. 1 is a top plan view of a unitized rake implement in a transport position, incorporating the principles of the instant invention.

Referring now to the drawings and, particularly, to FIGS. 1-3, a top plan and side elevational views of a unitized rake implement incorporating the principles of the instant invention can be seen.

Any left and right references are used as a matter of convenience and are determined by standing at the rear of the machine facing the forward end, the direction of travel. The unitized rake implement 10 is shown in a transport position in FIGS. 1-3. The frame 12 includes a central draft member 13 adapted at its forwardmost end with a hitch mechanism 14 for attachment to a prime mover, such as a tractor, shown in FIGS. 4 and 5 at T. The frame 12 also includes a right frame arm 15 supported above the ground G by a wheel 11 and pivotally connected at pivot 16 to the draft member 13. Similarly, a left frame arm 18 is also supported above the ground G by a wheel 11 and pivotally connected to the draft member 13 by a generally vertically extending pivot 19.

Each frame arm 15,18 supports a conventional side delivery rake basket 20 driven by a hydraulic motor 22. It should be noted that the plumbing for delivery of hydraulic fluid to the motors 22 and the hydraulic actuators to be discussed in greater detail below has not been shown in any of the FIGS. 1-21. The hydraulic plumbing is conventional in nature and has been deleted from the drawings for purposes of clarity. Each rake basket 20 is supported from a sub-frame assembly 25 movably mounted on the wheel spindle 26 positioned at the rearward end of the frame arms 15,18. As will be described in greater detail below, the sub-frame assemblies 25 are movable relative to the respective frame arms 15,18 to permit a positioning of the respective rake baskets 20 about the spindle 26 and, thereby, create a plurality of operative positions. Each sub-frame assembly 25 also includes a linkage mechanism 27 connecting the respective rake basket 20 to permit a generally vertical movement of the rake basket 20 relative to the ground G. Hydraulic lift cylinders 28 operatively associated with the linkage 27 provides a conventional lift mechanism for moving the rake baskets relative to the ground G. Flotation springs 29 also operatively associated with the linkage 27 provide a conventional floating operation of the rake baskets 20 over undulations in the ground surface.

Referring now to FIGS. 1-5 and 18-20, it can be seen that the sub-frame assemblies 25 are rotatably mounted on the spindles 26 and positionally controlled by a hydraulic cylinder 30 interconnecting the sub-frame 25 and a mounting pin 32 on the spindle 26. It can be seen from a comparison of FIGS. 1 and 4, that an extension of the hydraulic cylinders 30 affects a rotation of the rake baskets 20 about the respective spindle 26 and, thereby, changes the angle of the engagement of the rake baskets with the crop material lying on the ground. The extension of the hydraulic cylinder 30 combined with the pivotal rotation of the respective frame arms 15,18 results in a multitude of variable positions of the rake baskets 20 to affect multiple operative functions of the implement 10, two of which are shown as examples in FIGS. 4 and 5.

Figure 4:
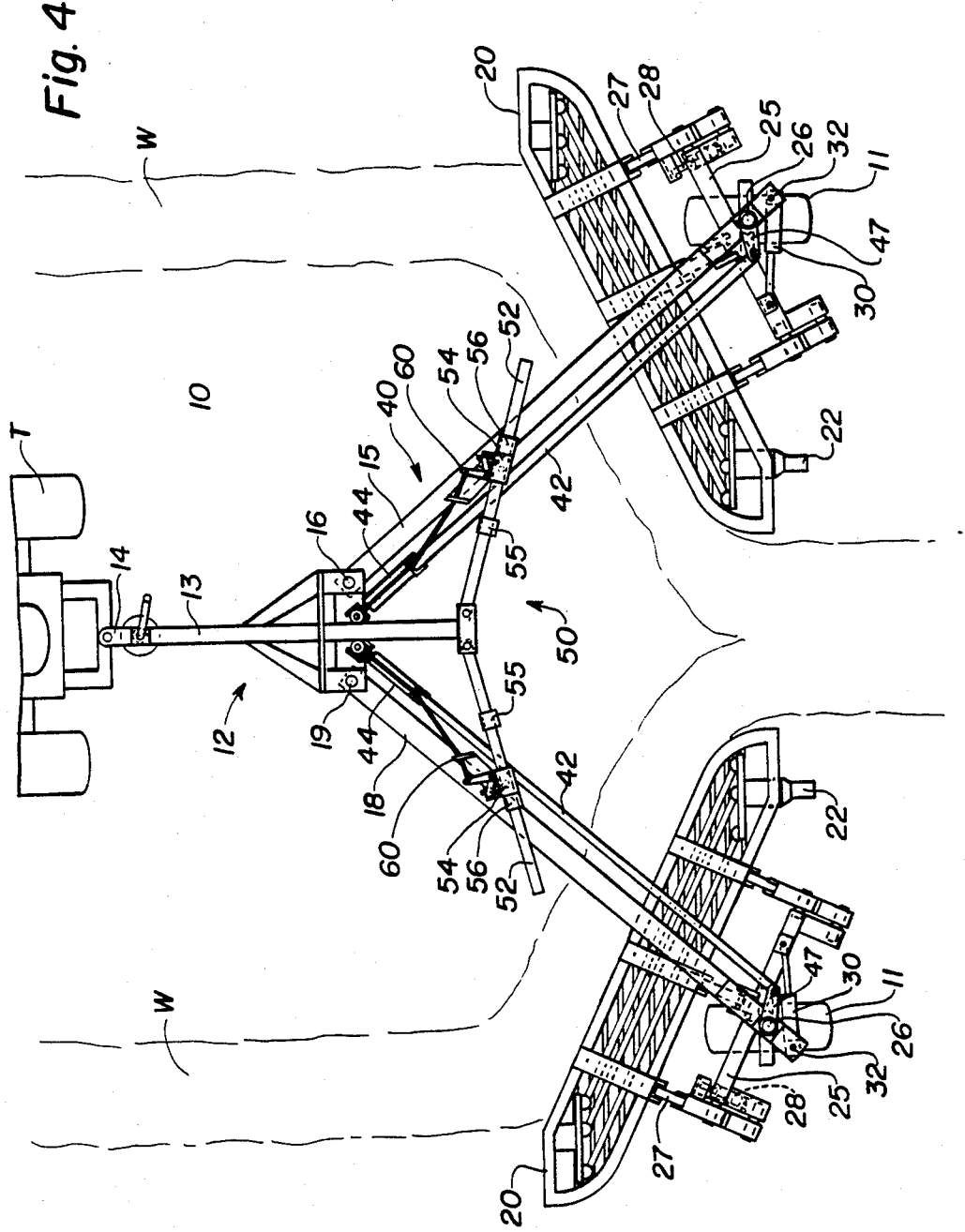
FIG. 4 is a top plan view of the unitized rake implement positioned in one of the operating positions to consolidate two spaced apart windrows of crop material lying on the ground into one centrally located windrow.

Referring more specifically to FIGS. 18-20, a variable stroke hydraulic cylinder control linkage 35 can best be seen. The linkage 35 includes a slide member 36 telescopically received within a bracket 37 having a plurality of apertures 38 vertically extending therethrough. A positioning of a bolt 39 through different apertures 38 changes the stroke permitted to the hydraulic cylinder 30. For example, a positioning of the bolt 39 through aperture 38a permits a maximum stroke for the cylinder 30 to be attained by reason that the slot 36a in the slide member 36 does not bottom out against the bolt 39 until the cylinder has reached the predetermined stroke, as shown in FIG. 18. A repositioning of the bolt 39 into the aperture 38c, shown in FIG. 20, affectively limits the stroke of the hydraulic cylinder 30 to a minimum length because of an early bottoming out of the slot 36a in the slide member 36 against the bolt 39. Similarly, a positioning of the bolt 39 and one of the intermediate apertures 38b can set the desired stroke of the hydraulic cylinder at a different predetermined location. This control linkage 35, which is manually adjustable between predetermined settings, results in a repeatability of the affectable rotation of the rake baskets 20 to a predetermined location when the operator changes from a transport position, seen in FIG. 1 to an operative position, such as shown in FIG. 4.

Figure 22:
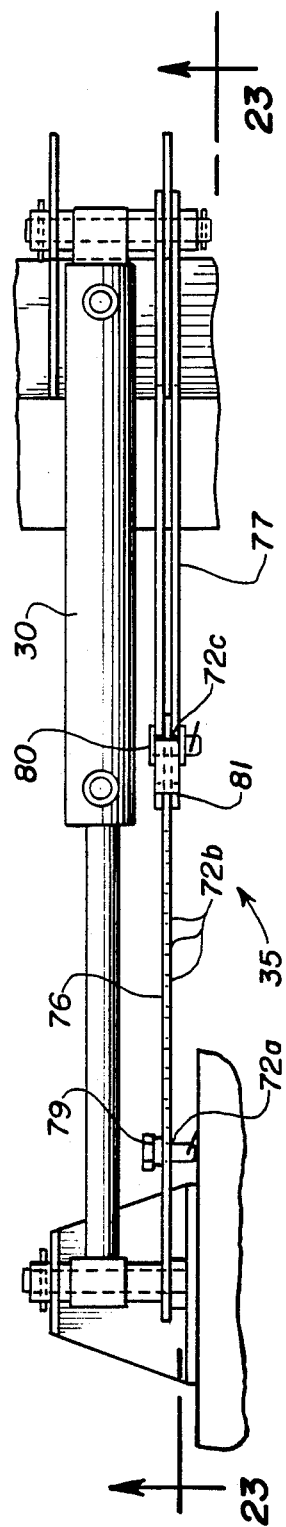
FIG. 22 is an enlarged elevational view corresponding to FIG. 18 of the hydraulic cylinder and an alternative embodiment of the stroke control linkage.
Figure 23:
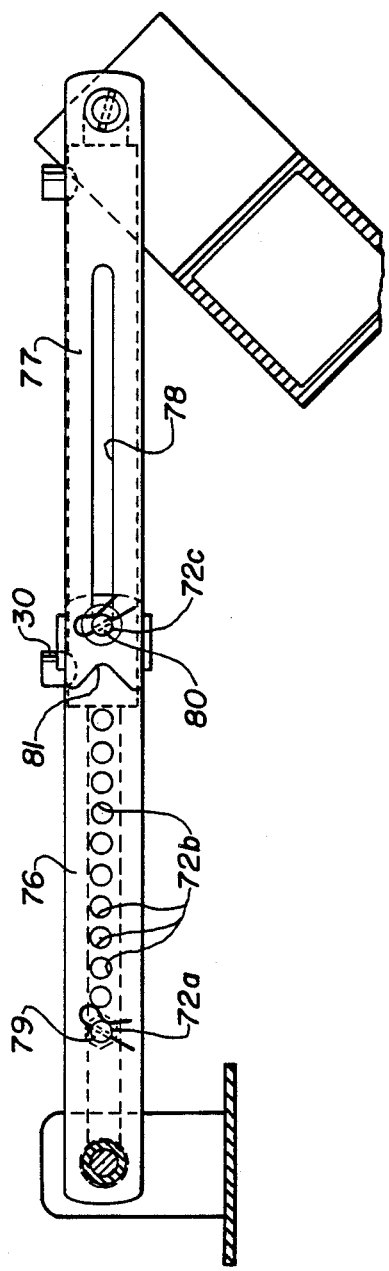
FIG. 23 is a cross-sectional view taken along lines 23—23 of FIG. 22, showing the bottom plan view of the alternative stroke control linkage.

An alternative embodiment of the stroke control linkage 35 can be seen in FIGS. 22 and 23. The slide member 76 is provided with a plurality of holes 72 therethrough along the length thereof. The bracket member 77 is provided with a slot 78 extending along its length and telescopically receives the slide member 76. The bracket 77 is also provided with a detent 81 formed in the end telescopically receiving the slide member 76. By positioning a pin or bolt 79,80 in both the first and last holes 72a, 72c, respectively, the stroke control linkage 55 will permit a maximum stroke of the cylinder 30. When the cylinder 30 fully retracts, the bolts 79, will bottom out in the slot 78 and in the detent 81 at the same time.

Adjustment of the length of stroke of the cylinder 30 is accomplished by a repositioning of the bolts 79,80 in one of the intermediate holes 72b. Movement of the bolt 79 externally of the slot 78 shortens the retraction stroke of the cylinder 30, preventing the cylinder 30 from completely retracting. Movement of the bolt 80 into an intermediate hole 72b, yet keeping the bolt 80 within the slot 78 shortens the extension stroke of the cylinder 30. It should be noted that the cylinder 30 must be at least partially retracted to effect a repositioning of the bolt 80 within the slot 78 and into one of the intermediate holes 72b.

As best seen in FIGS. 1-5, 13 and 14, the spindle 26 for each wheel 11 is rotatably mounted at the end of the respective frame arm 15,18. The rotated position of the respective wheels 11 relative to the central draft member 13 is controlled through a steering linkage 40. The steering linkage is a four-bar linkage controlling the rotation of the wheel 11 along any position of the frame arm 15,18 rotated about the respective pivot 16,19. The control link 42 extends generally parallel to the respective frame arm 15,18 and is variable in length by reason of the hydraulic cylinder 44 interconnecting the draft member 13 and the control link 42. The control link 42 is pivotally connected to a steering link 47, which in turn is fixed to the spindle 26. An extension of the hydraulic steering cylinder 44 increases the effective length of the control link 42 and results in a rotation of the spindle 26 and, consequently, the wheel 11.

Figure 11:
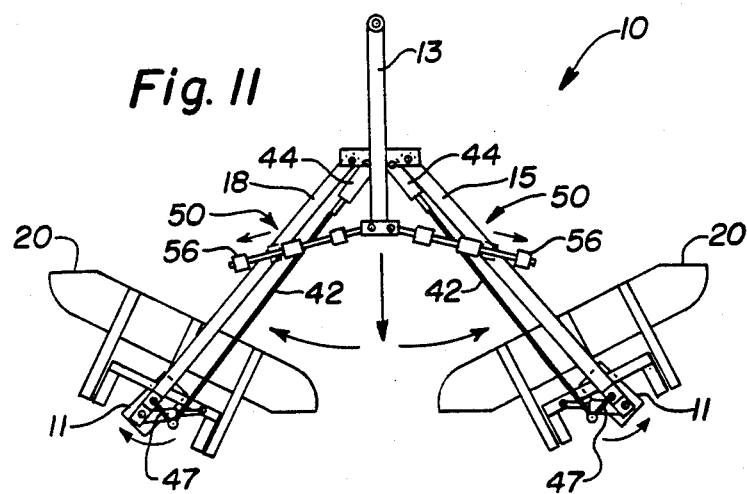
FIGS. 11 and 12 are additionally schematic top plan views of the unitized rake implement showing the operative sequence for repositioning the side delivery rake baskets from the operative position seen in FIG. 10 to the operative position shown in FIG. 12, which corresponds to the operative position shown in FIG. 5.

The extension of the hydraulic cylinder 44 affects a rotation of the wheel 11 as schematically indicated in FIGS. 7 and 11 so as to be turned obliquely to the direction of travel which is parallel to the orientation of the draft member 13. A subsequent movement of the implement 10 in a rearward direction causes an outward rotation of the frame arms 15,18 about their respective pivots 16,19 and laterally displaces the rake baskets 20 mounted thereon. A forward movement of the implement 10 would similarly affect an inward rotation of the frame arms 15,18 to move the rake baskets 20 toward one another into the transport position. A return of the hydraulic steering cylinder 44 to its collapsed length returns the wheels 11 to a position parallel with the direction of travel irrespective of the rotated position of the corresponding frame arm 15,18 by reason of the fixed parallelogram formed by a portion of the draft member 13, the respective frame arm 15,18, the control link 42, and the steering link 47. Once the wheels 11 have been returned to an orientation parallel to the direction of travel, which is automatically accomplished upon a complete retraction of the steering cylinder 44, no further rotation of the frame arms 15,18 will be affected by movement either forward or rearward of the implement 10.

A stabilizer mechanism 50 provides a limit to the extent of pivotal movement of the frame arms 15,18 about their corresponding pivots 16,19. The stabilizer mechanism 50 includes a stabilizer bar 52 corresponding to each of the frame arms 15,18. The stabilizer bar 52 is pivotally connected at one end to the draft member 13 and telescopically received through a tubular sleeve 54 mounted on each respective frame arm 15,18. The stabilizer bar 52 is provided with a number of apertures 53 extending generally horizontally therethrough. A pair of adjustable stops 55,56 are mounted on the stabilizer bar 52 by bolts 58 extending through the stops 55,56 and selected apertures 53 in the stabilizer bar 52.

The inside stop 55 restricts the movement of the stabilizer bar 52 through the tubular sleeve 54 when the corresponding frame arm 15,18 is rotated inwardly to position the implement 10 in its transport position. The positioning of the inside stop 55 limits the inward travel of the corresonding frame arm 15,18 to prevent the rake baskets from impacting one another when positioned in the transport position. The outside stop 56 is positionally movable along the length of the stabilizer bar to a number of preselected positions to restrict the outward rotation of the corresponding frame arms 15,18. The use of the outside stops 56 permits a repeatability of the positioning of the rake baskets into an operating position when an operator travels from field to field. Each selectable position of the outside stop 56 corresponds to an operative rotated position of the corresponding frame arm 15,18, such as shown in the differences between operative positions of FIGS. 4 and 5, by limiting the travel of the stabilizer bar 52 through the tubular sleeve 54.

Referring now to FIGS. 1-6 and 13-17, the latching mechanism 60 for locking the rotated position of the respective frame arm 15,18 about its corresponding pivot 16,19 can best be seen. The latching mechanism 60 includes a spring loaded pin 62 housed within a bracket 63 affixed to the tubular sleeve 54. The spring 64 urges the pin 62 away from the back of the bracket 63 and into engagement with one of the apertures 53 in the stabilizer bar 52. When the pin 62 is engaged with one of the apertures 53, the stabilizer bar 52 is positionally fixed with respect to the tubular sleeve 54 and movement therebetween is prevented. Since the stabilizer bar 52 cannot pass through the sleeve 54, the respective frame arm 15,18 is prevented from rotating about its pivot 16,19.

Release of the pin 62 from the stabilizer bar 52 is accomplished automatically upon actuation of the hydraulic steer cylinder 44. A cable 65 fastened at one end between the barrel and rod end of the hydraulic steering cylinder 44 transfers the extension motion of the hydraulic steering cylinder 44 to the latching mechanisms 60. The latching end 66 of the cable 65 is fastened to a first cantilevered member 67 pivotally supported on the tubular sleeve 54. A second cantilevered member 68 is concentrically mounted with the first cantilevered member 67 and is connected to the spring-loaded pin 62. The first cantilevered member 67 is rotatable relative to the second cantilevered member 68. A torsion spring 69 interconnects the first and second cantilevered member 67,68 to permit a transfer of motion therebetween.

The motion induced by the hydraulic steering cylinder 44 through the cable 65 affects a rotation of the first cantilevered member 67. If, because of side forces exerted on the spring-loaded pin 62 by the stabilizer bar 52, the pin 62 is not free to be retracted from the aperture 53 in the stabilizer bar 52, the torsion spring 69 will permit a relative rotation between the first cantilevered member 67 and the second cantilevered member 68, yet exert a force on the second cantilevered member 68 to urge a retraction of the pin 62 from the stabilizer bar 52. When the side forces exerted on the pin 62 are removed, the torsion spring 69 will overcome the force exerted by the coil spring 64 and retract the pin 62 from the stabilizer bar by affecting movement of the second cantilevered member 68. When the frame arm 15,18 has been rotated to the preselected position and the wheel 11 has been returned to an orientation parallel to the direction of travel by a retraction of the hydraulic steering cylinder 44, a relaxation of the cable 65 will result and remove the load exerted by the torsion spring 69, permitting the coil spring 64 to reinsert the pin 62 into the stabilizer bar 52. Once the pin 62 and the aperture 53 in the stabilizer bar 52 are properly aligned, the pin 62 seats into the stabilizer bar 52 locking the rotative position of the corresponding frame arm 15,18.

The implement 10 depicted in the drawings has several positions at which the outside stop 56 can be selectively located. At each selectable position of the outside stop 56, the pin 62 is alignable with an aperture 53 in the stabilizer bar 52. The spacing of the apertures 53 is such that when the tubular sleeve 54 comes against either of the stops 55,56, the pin 62 will be in alignment with one of the apertures 53. One skilled in the art will readily recognize that for proper functioning, the torsion spring 69 and the coil spring 64 must be properly balanced. The torsion spring 69 must be stiff enough to apply sufficient force to retract the pin 62 when it is not bound in one of the apertures 53. The torsion spring 69 must also be capable of deflecting through the angular motion needed when the pin 62 is bound in one of the apertures 53 by side forces even though the first cantilevered members 67 is being rotated by the cable 65. Whenever the pin 62 is bound within the stabilizer bar 52, a forward or rearward movement of the implement 10 will be sufficient to remove the side forces and free the pin 62 from the stabilizer bar 52. Furthermore, the torsion spring 69 protects the cable 65 from being overloaded with tensile forces due to a bound pin 62.

The operation of the implement 10 in converting from a transport position to two of the different operating positions can best be seen in the schematic views of FIGS. 6–12. The transport position of the implement 10 is seen in FIG. 6, which corresponds to the more detailed view of FIG. 1. In the transport position, the rake baskets 20 are aligned generally parallel to the direction of travel and the frame arms 15,18 are pivotally rotated inwardly so that the tubular sleeve 54 is positioned adjacent the inside stop 55. The operator first actuates the hydraulic steering cylinders 44 to turn the wheels 11 obliquely to the direction of travel with the forward portions of the wheels 11 directed inwardly toward the rake baskets 20, as depicted in FIG. 7. As noted above, the extension of the hydraulic steer cylinders 44 affects an unlatching of the latching mechanism 60 to permit the stabilizer bar 52 to slide through the tubular sleeve 54.

As depicted in FIG. 8, the operator then rearwardly moves the implement 10. The obliquely slanted wheels 11 affects an outward rotation of the frame arms 15,18 upon the rearward movement of the implement 10 until the stabilizer bar has slid through the tubular sleeve 54 sufficiently far that the outside stop 56 is engaged by the tubular sleeve 54. The position of the outside stop 56 is selected to correspond to the desired transverse location of the respective rake baskets. Referring now to the schematic view of FIG. 9, the operator then retracts the hydraulic steering cylinders 44 to return the wheels 11 to an orientation parallel with the direction of travel. As is noted above, the retraction of the cylinders 44 relaxes the cable 65 to permit the spring-loaded pin 62 to reengage with the stabilizer bar 52 and lock the rotated position of the frame arms 15,18 at the preselected desired position.

As depicted in FIG. 10, a subsequent actuation of the hydraulic cylinders 30 affects a rotation of the subframe assemblies 25 and attached rake baskets 20 about the respective wheel spindles 26 until the desired angular orientation of the rake baskets 20 is achieved. As noted above, by utilizing the control linkage 35, the stroke of the hydraulic cylinder 30 can be restricted so that the angular orientation of the rake baskets 20 can be positioned at a preselected location. For a given adjusted position of the control linkage 35 and the outside stop 56, the rake baskets 20 will always open into the same transversely spaced and angularly oriented position each time the implement 10 is converted from its transport position into an operative position.

Figure 12:
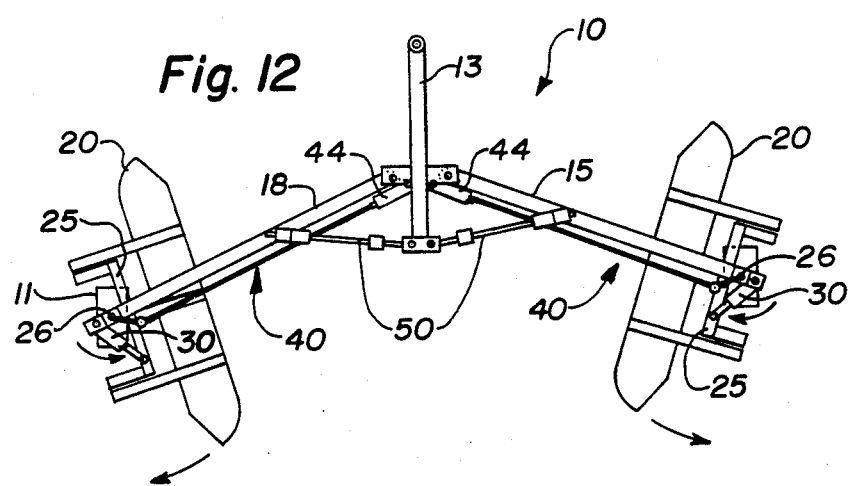

Referring now to the schematic views of FIGS. 11 and 12, a positioning of the implement 10 into an alternative operative position can best be seen. It is irrelevant whether the implement 10 begins at its transport position shown in FIG. 6 or one of the other operating positions such as shown in FIG. 10. The outside stop 56 is relocated to an alternative position along the stabilizer bar 52. If the angular orientation of the rake basket 20 relative to the corresponding frame arm 15,18 is desired to be modified, it is necessary to readjust the hydraulic cylinder stroke control linkage 35. Subsequently, the operator actuates the hydraulic steering cylinders 44 again positioning the wheels 11 at an oblique orientation relative to the direction of travel and the implement 10 is moved in a rearward direction until the stabilizer bar 52 has slid through the tubular sleeve 54 sufficiently to engage the relocated outside stop 56.

As before, the operator can actuate the hydraulic steering cylinders 44 to affect a retraction thereof and reorient the wheels 11 in a direction parallel to the path of travel and then actuate the hydraulic cylinders 30 to angularly position the rake baskets 20 relative to the corresponding frame arms 15,18, such as shown, for example, in FIG. 12, to provide the desired function. As noted above, the latching and unlatching of the latching mechanism 60 occurs automatically with the actuation of the hydraulic steering cylinders 44. In the operative position shown in the FIGS. 5 and 12, the implement 10 is operable to engage a pair of laterally spaced windrows W of crop material and gently turn the windrow over until the top comes positioned on the bottom of the windrow after being discharged from the rake basket 20.

Figure 5:
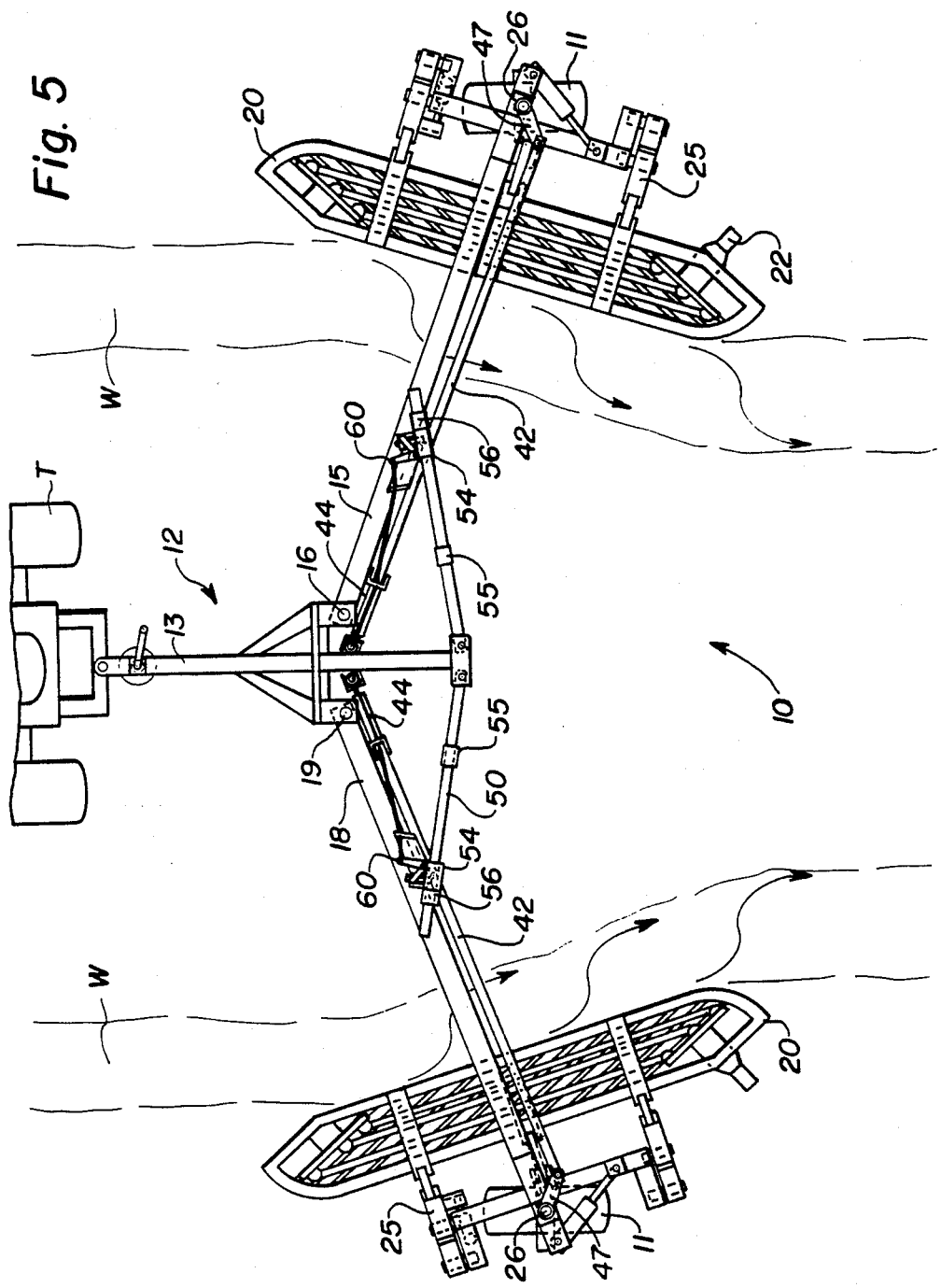
FIG. 5 is a top plan view similar to that seen in FIG. 4 except that the side delivery rake baskets are positioned to effect a turning and a lateral displacement of two spaced apart windrows of crop material lying on the ground.

In the operative position of FIGS. 4 and 10, the angular orientation of the rake baskets 20 is more perpendicular to the direction of travel than that of FIGS. 5 and 12 and, as a result, the windrows W engaged by the respective rake baskets are laterally displaced a greater distance. As shown in FIG. 4, the operative position of FIGS. 4 and 10 will combine two laterally spaced windrows W into one centrally discharged windrow or rake two swaths of crop material lying on the ground into one centrally discharged windrow. By varying the angular disposition of the rake baskets and the pivotal movement of the frame arms 15,18, the overall raking width and the central discharge opening between the rake baskets 20 can be selectively varied.

Figure 21:
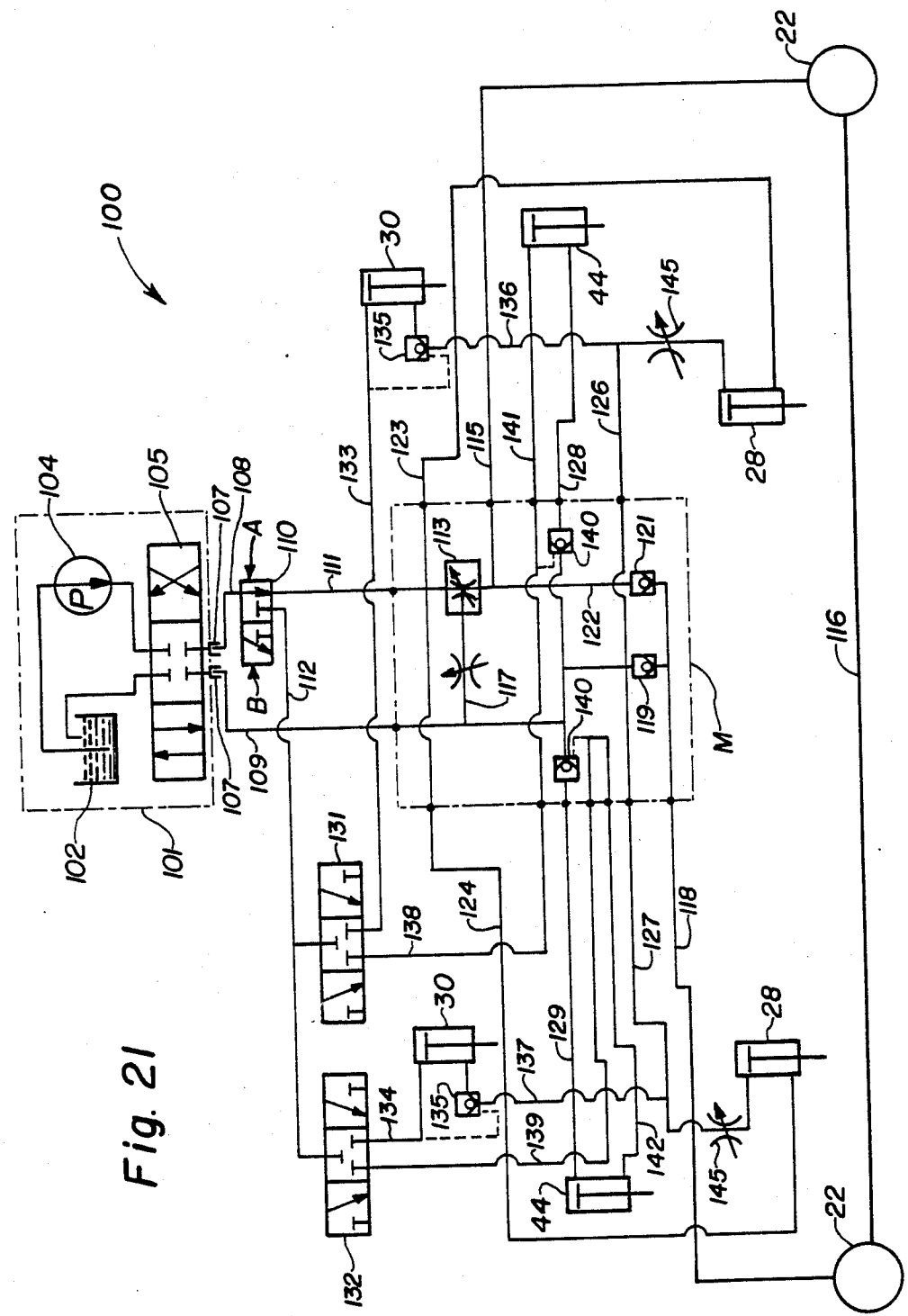
FIG. 21 is a diagrammatic view of the hydraulic system used on the unitized rake implement to control the various movable hydraulic components through a single tractor hydraulic circuit.

Referring now to FIG. 21, the hydraulic circuitry utilized on the implement 10 to power all of the hydraulic cylinders 28,30 and 44, as well as the hydraulic motors 22 from a single hydraulic circuit from the prime mover T can best be seen. The hydraulic system 100 begins with the tractor hydraulics 101 which include a reservoir 102, a pump 104, and a control valve 105. The control valve 105 includes a central neutral position, a straight line position and a cross-over position. In the straight line position, the valve 105 is shifted toward the right as depicted in FIG. 21 so that the line 108 becomes the pressure supply line and 109 becomes a return line for oil to return to the reservoir 102. Conversely, when the valve 105 is in the cross-over position, the line 109 becomes the pressure supply line and line 108 becomes the return line.

After passing through the tractor disconnect 107, line 108 is directed into a two position selector valve 110 which permits the operator to select between loop A and loop B. Loop A directs the flow of oil through line 111 into a manifold M that houses a pressure compensated flow control valve 113 which regulates the flow of oil from line 111, through 115 and into the hydraulic motors 22 which are connected in series by line 116. The flow control valve 113 can direct the flow of oil demanded by the hydraulic motors 22 through line 115 and return any excess flow across line 117 and line 109 into the reservoir 102. The flow of fluid returning from the motors 22 returns to the reservoir 102 through line 118, past the check valve 119 and through 109. The flow of oil from the motors 22 through line 118 cannot pass through check valve 121 because of the pressurization in the line 122 leading from the flow control valve 113 to the check valve 121.

With the pressurization of line 111, lines 123 and 124 also become pressurized due to the connection thereof with line 111. Lines 123 and 124 pressurize the back side of the hydraulic lift cylinders 28 on the right and left rakes, respectively, to assure that the rake baskets are forced downwardly into a raking position adjacent the ground whenever the hydraulic motors 22 are operated. Any excess fluid in the cylinders 28 can pass through lines 126 and 127, respectively, and ultimately through line 109 into the reservoir 102.

By maintaining the selector valve 110 in its loop A position and shifting the control valve 105 into its cross-over position, which would be shifted to the left in the orientation seen in FIG. 21, line 109 becomes the pressure supply line to direct the flow of fluid into the manifold M and into lines 126 and 127 to power the operation of the respective lift cylinders 28 to raise the rake baskets 20 into a transport position. It should be noted that the flow of fluid cannot pass through line 117 from line 109 into the flow control valve 113 because of an internal mechanism to permit the flow of fluid in only one direction through the valve 113. Accordingly, pressurized flow of fluid cannot reach the hydraulic motors 22 due to the restriction in valve 113 and the presence of check valve 119 to prevent the flow of fluid through line 118 into the back side of the motors 22. Furthermore, the flow of pressurized fluid from line 109 cannot actuate the steering cylinders 44 through lines 128,129 because of the positioning of the selector valve 110 in loop A, so that the flow path of fluid from the cylinders 44 cannot return to the reservoir 102. Accordingly, it can be seen that the positioning of selector valve 110 into loop A can actuate only the operation of the motors 22 or a raising of the lift cylinders 28 depending upon the positioning of the valve 105.

The positioning of the selector valve 110 into loop B permits the flow of pressurized fluid from line 108 into line 112 which in turn directs fluid into the rotary diverter valves 131 and 132 controlling the operation of the right-hand and left-hand mechanisms respectively.

The rotary diverter valves 131,132 are positionable in one of three positions, a central neutral position in which the flow of fluid is blocked at the valve 131,132, a first position to direct the flow of fluid to the basket angling cylinders 30 and a second position to direct the flow of fluid to the steering cylinders 44. The actuation of the valve 131,132 is independently selectable by the operator to actuate either the left or right hand cylinders independently or in unison. Further description here will assume that a simultaneous actuation of the valves 131,132 into identical positions.

Positioning of the valves 131,132 into its first position directs the flow of fluid through lines 133,134 to pressurize the basket angling cylinders 30. A pilot operated check valve 135 operably associated with each cylinder 30 permits the flow of hydraulic fluid from the back side of the cylinders 30 past the check valve 135. Only when lines 133,134 are pressurized can fluid then flow through lines 136,137 into lines 126,127, respectively, and through line 109 into the reservoir 102, completing the hydraulic circuit for the basket angling cylinders. Similarly, the positioning of the valves 131,132 into its second position to direct the flow of pressurized fluid into the steering cylinders 44 causes the flow of fluid to flow from line 112 through lines 138,139 and into the manifold M to actuate a pair of pilot operated check valves 140 housed within the manifold M and onwardly to the steering cylinders 44 through lines 141 and 142, respectively. Because of the pressurization of lines 138,139, the pilot operated check valves 140 permit the passage of fluid from the cylinders 44 through lines 128,129 into the return line to the reservoir 102.

The above description with respect to loop B of the selector valve 110 incorporates the positioning of the tractor valve 105 in its straight through position to pressurize line 112. A selecting of the positions of valves 131,132 permits a selection of operation of either cylinders 30 or 44 in one direction only. To restroke the cylinders 30,44 in the opposite direction, the operator needs to reposition the tractor control valve 105 to its cross-over position to pressurize line 109. A pressurized flow of fluid can enter lines 128,129 through check valves 140 to restroke the steering cylinders 44 forcing a return of fluid through lines 141 and 142 back through the diverter valves 131,132 and lines 112 and 108 to the reservoir 102. This flow path can be accomplished only if the diverter valves 131,132 are positioned in their second position to permit the flow of fluid therethrough from line 138,139 into line 112. A positioning of the valves 131,132 in either the neutral or first positions would block the flow of fluid from 139 and prevent an actuation of the steering cylinders 44.

A pressurized flow of fluid from line 109 can also pass through lines 126,127 and into lines 136,137 past the check valves 135 to restroke the angling cylinders 30 returning fluid through lines 133,134 into the diverter valves 131,132 which are positioned in their first positions and then back through lines 112,108 to the reservoir 102. Accordingly, it should be noted that the positioning of the tractor control valve 105 into its crossover position can affect a selective restroking of the cylinders 30,44 depending upon the selected position of the diverter valves 131,132. It should also be noted that the lift cylinders 28 will not be actuated by a pressurized flow of fluid within lines 126,127 because of a positioning of a selector valve 110 in the loop B position which blocks the flow of fluid from the cylinders 28 through loop A of the selector valve 110 and back to the reservoir 102. However, due to an internal flow path from the lift cylinders 28 through lines 125,124, the flow control valve 13, lines 115, 116,118 and back to line 127 through the motors 22 and check valve 119, it is possible that minor movement of both the lift cylinders 28 and the motors 22 may result. The hydraulic circuit 100 is also provided with shutoff valves 145 positioned in lines 126,127 adjacent the lift cylinders 28 to lock the lift cylinders in a raised position for transport by preventing the flow of fluid through the cylinders 28.

Through use of the above-described hydraulic system 100, the selective operation of the hydraulic motors 22, the lift cylinders 28, the basket angling cylinders 30 and the steering cylinders 44 can be actuated on either the left or right rake basket assemblies from a single hydraulic circuit incorporated into the prime mover T. Through a control box housed in the operator's compartment of the prime mover T and cables extending therefrom to the valves 110,131 and 132, the operator can select the operation of the desired hydraulic component and affect actuation thereof from the tractor hydraulics 101 through the control valve 105. An additional speed control could optionally extend from the operator's compartment on the prime mover T to the flow control valve 113 to control the speed of operation of the hydraulic motors 22. Alternatively, the flow control valve 113 can be manually adjusted externally of the operator's compartment.

It will be understood that changes in the details, materials, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A variable stroke control mechanism for use with a linear actuator having a base end and an extension end, said extension end being selectively linearly movable relative to said base end for a stroke distance along both an extension stroke wherein said extension end moves away from said base end and a retraction stroke wherein said extension end moves toward said base end, said variable stroke control mechanism being operable to selectively vary the length of said stroke distance, comprising:

a slide member operably connected to said extension end and movable therewith, said slide member having a plurality of holes formed therein and being spaced along the length thereof;

a bracket member operably connected to said base end and adapted for telescopically receiving said slide member, said bracket member having a slotted opening formed therein and alignable with the holes in said slide member during the telescopic movement of said slide member relative to said bracket member; and an extension limiting mechanism operably associated with said slide member and said bracket member to limit the amount of movement of said slide member telescopically from said bracket member, said extension limiting mechanism including a first removable fastener insertable through a selected one of said holes to engage said slotted opening and limit the length of stroke of said linear actuator, said fastener being positionable through a selected one of said holes and said slotted opening to vary the length of said extension stroke, a second fastener being positionable within one of said holes externally of said slotted opening to vary the length of said retraction stroke, whereby said extension limiting mechanism is operable to selectively vary the amount of permissible extension of said slide member from said bracket member with respect to both the extension stroke and the retraction stroke.

2. The stroke control mechanism of claim 1 wherein said bracket member includes a detent in the end thereof receiving said slide member to engage a fastener positioned in said slide member externally of said bracket member.

* * * * *